US00RE39117E

(19) United States
(12) Reissued Patent
Matsumoto

(10) Patent Number: US RE39,117 E
(45) Date of Reissued Patent: Jun. 6, 2006

(54) BLOWER

(75) Inventor: Kaoru Matsumoto, Nagano-ken (JP)

(73) Assignee: Minebea Co., Ltd., Nagano (JP)

(21) Appl. No.: 10/807,229

(22) Filed: Mar. 23, 2004

Related U.S. Patent Documents

Reissue of:
(64) Patent No.: 6,368,081
Issued: Apr. 9, 2002
Appl. No.: 09/603,973
Filed: Jun. 26, 2000

(30) Foreign Application Priority Data

Nov. 19, 1999 (JP) ..... 11-329598

(51) Int. Cl.
*F04B 17/00* (2006.01)

(52) U.S. Cl. ..... 417/423.15; 417/423.1; 415/58.2; 416/181

(58) Field of Classification Search ..... 417/423.15, 417/423.1, 423.7, 423.12, 423.2; 415/58.2, 415/58.3, 58.6; 416/181, 185, 186 R, 187, 416/178

See application file for complete search history.

(56) References Cited

U.S. PATENT DOCUMENTS 985,152 A * 2/1911 Fieroe ..... 416/178
1,513,763 A * 11/1924 Rowe ..... 416/187
1,700,017 A * 1/1929 Bender ..... 416/187
3,262,637 A * 7/1966 Sprouse et al. ..... 416/178
4,164,690 A * 8/1979 Muller et al. ..... 318/254
4,689,507 A * 8/1987 Baker et al. ..... 310/62
5,947,704 A * 9/1999 Hsieh ..... 417/423.12
6,137,197 A * 10/2000 Taniguchi et al. ..... 310/67 R
RE37,261 E * 7/2001 Schmider et al. ..... 417/423.7
6,278,207 B1 * 8/2001 Matsumoto ..... 310/88
6,290,471 B1 * 9/2001 Horng ..... 417/354
6,309,190 B1 * 10/2001 Chen ..... 417/423.1
6,345,956 B1 * 2/2002 Lin ..... 416/178
6,379,126 B1 * 4/2002 Konno ..... 417/423.1
6,394,767 B1 * 5/2002 Matsumoto ..... 417/423.1
6,447,272 B1 * 9/2002 Tsuchiya ..... 417/423.12
6,488,483 B1 * 12/2002 Hsieh ..... 417/354
6,511,299 B1 * 1/2003 Shinokubo et al. ..... 417/354
6,540,476 B1 4/2003 Huang et al. ..... 415/98
6,612,814 B1 * 9/2003 Shih et al. ..... 417/354

(Continued)

FOREIGN PATENT DOCUMENTS

JP S62-158198 10/1987
JP H11-218096 8/1999
JP 3277641 4/2000

OTHER PUBLICATIONS

Sep. 17, 2002 Japanese Patent Office Action from Japan Patent Application No. 11–329598 (with English–language translation).

(Continued)

*Primary Examiner*—Cheryl Tyler
*Assistant Examiner*—William H. Rodriguez
(74) *Attorney, Agent, or Firm*—Oliff & Berridge, PLC

(57) ABSTRACT

A blower with the improved P-Q characteristics is provided. A blower comprising a shaft rotatably supported in a tubular casing, a cup shaped motor yoke 11 fixed to the shaft, and a body portion 15 of an impeller 14 comprising a large number of blades 13 on an outer peripheral portion is fixed to the motor yoke 11, wherein the blower is characterized in that substantially ring-like openings 15b are provided at a portion where the blades 13 of the body portion 15 are mounted and on a circumference around the shaft. Since air flow is facilitated by the openings 15b, the P-Q (pressure—flow rate) characteristics are improved.

22 Claims, 6 Drawing Sheets

U.S. PATENT DOCUMENTS

| | | | | | |
|---|---|---|---|---|---|
| 6,616,422 | B1 | * | 9/2003 | Hsieh | 417/354 |
| 6,652,246 | B1 | | 11/2003 | Lin et al. | 417/360 |
| 6,655,929 | B1 | * | 12/2003 | Hsieh | 417/368 |
| 6,700,257 | B1 | | 3/2004 | Lin | 310/90 |
| 6,712,582 | B1 | | 3/2004 | Lin et al. | 415/206 |
| 6,726,450 | B1 | * | 4/2004 | Lee et al. | 415/230 |
| 6,773,239 | B1 | | 8/2004 | Huang et al. | 417/354 |
| 6,786,706 | B1 | * | 9/2004 | Shinokubo et al. | 417/354 |
| 2003/0143070 | A1 | * | 7/2003 | Huang et al. | 415/206 |
| 2005/0047088 | A1 | * | 3/2005 | Xu et al. | 361/695 |
| 2005/0047916 | A1 | * | 3/2005 | Li et al. | 416/186 R |

OTHER PUBLICATIONS

Dec. 17, 2002 Japanese Patent Office Action from Japan Patent Application No. 11–329598 (with English–language translation).

* cited by examiner

FIG.6

| flowing rate $m^3/min$ | pressure Pa | speed $min^{-1}$ |
|---|---|---|
| 0.000 | 238.3 | 4831 |
| 0.038 | 234.8 | 4832 |
| 0.063 | 232.5 | 4824 |
| 0.099 | 225.4 | 4806 |
| 0.139 | 219.1 | 4784 |
| 0.178 | 212.7 | 4759 |
| 0.223 | 204.2 | 4720 |
| 0.275 | 194.4 | 4675 |
| 0.325 | 181.7 | 4612 |
| 0.372 | 166.6 | 4546 |
| 0.419 | 151.8 | 4474 |
| 0.460 | 140.0 | 4429 |
| 0.499 | 124.9 | 4353 |
| 0.537 | 108.3 | 4257 |
| 0.575 | 90.7 | 4165 |
| 0.617 | 72.8 | 4086 |
| 0.658 | 55.1 | 4017 |
| 0.699 | 36.6 | 3938 |
| 0.740 | 14.8 | 3833 |
| 0.778 | 0.0 | 3739 |

FIG. 7

| flowing rate $m^3/min$ | pressure Pa | speed $min^{-1}$ |
|---|---|---|
| 0. 000 | 204. 8 | 5046 |
| 0. 038 | 202. 4 | 5015 |
| 0. 072 | 197. 7 | 4969 |
| 0. 108 | 190. 7 | 4923 |
| 0. 144 | 185. 8 | 4890 |
| 0. 187 | 179. 3 | 4840 |
| 0. 233 | 170. 4 | 4775 |
| 0. 278 | 159. 5 | 4719 |
| 0. 328 | 149. 5 | 4653 |
| 0. 372 | 137. 8 | 4578 |
| 0. 420 | 128. 7 | 4481 |
| 0. 461 | 121. 9 | 4390 |
| 0. 503 | 112. 2 | 4305 |
| 0. 538 | 100. 1 | 4223 |
| 0. 576 | 84. 7 | 4126 |
| 0. 617 | 69. 7 | 4051 |
| 0. 660 | 54. 1 | 3970 |
| 0. 695 | 38. 4 | 3882 |
| 0. 739 | 18. 2 | 3799 |
| 0. 773 | 0. 0 | 3743 |

BLOWER

Matter enclosed in heavy brackets [ ] appears in the original patent but forms no part of this reissue specification; matter printed in italics indicates the additions made by reissue.

*This is one of two (2) reissue applications directed to various aspects of a blower described in U.S. Pat. No. 6,368,081, which corresponds to U.S. patent application Ser. No. 09/603,973 filed Jun. 26, 2000. The first filed reissue application is the present application, application Ser. No. 10/807,229, filed Mar. 23, 2004. The second reissue application is application Ser. No. 11/131,769, filed May 18, 2005, which is a continuation of said application Ser. No. 10/807,229, filed Mar. 23, 2004 (and, as noted above, which is a reissue of U.S. Pat. No. 6,368,081, which corresponds to U.S. patent application Ser. No. 09/603,973 filed Jun. 26, 2000).*

BACKGROUND OF THE INVENTION

1. Field of the Invention

The present invention relates to an improvement of a blower for use in various kinds of office automation apparatus.

2. Description of the Related Art

In various kinds of office automation apparatus, since a large number of electronic circuits are housed in a box of the apparatuses, it is difficult to discharge heat generated by electronic components forming the electronic circuits, and thus, there is a fear that a part of the electronic components may be broken or deteriorated. In particular, in the context of the recent trend toward miniaturization of office automation apparatuses, since the apparatuses are miniaturized while the quantity of heat generated almost remains the same, how to deal with the heat is an important technical problem to be solved. In order to solve the problem, an air vent for attaching a blower therein is provided in a side wall of an apparatus to discharge the heat inside to the outside of the apparatus, thereby preventing damage due to the heat generated inside.

An example of a conventionally often used blower is described with reference to FIG. 3. Sign 1 shows a casing which is tubular. An integrally molded housing 2 is provided on the right in FIG. 3 inside the casing 1. A bearing linear 3 is inserted into the housing 2. Outer races of bearings 4 and 5 are supported by the inner side of the bearing liner 3, and a shaft 6 is inserted into the inner races of the bearings 4 and 5. A race 7 is attached to the lower end of the shaft 6 for preventing the shaft 6 from falling off and for axially positioning the shaft 6.

Knurl 8 is provided on the upper end of the shaft 6, and is fixed to a boss 9 formed by die casting zinc. Springs 10 are provided between the boss 9 and the inner race of the bearing 4 for providing thrust load on the bearing 4. A center portion of a cup-like motor yoke 11 is fixed to the boss 9. On the boss 9, the central portion of a cup shaped yoke 11 is fixed, and on the inner peripheral portion, a ring shaped magnet 12 is fixed. A body portion 15 of an impeller 14 provided with blades 13 is fixed to the outer peripheral portion of the motor yoke 11. The shaft 6, the motor yoke 11 and the impeller 14 form a rotating portion.

A stater core 17 around which a stator winding 16 is wound, is provided in the inner peripheral portion of the motor yoke 11 to form a fixed portion. A pin-like connection terminal 18 is provided in a projected manner from the stator core 17 downwardly to pierce a PC board 19 supported by the housing 2. An electronic circuit is mounted on the PC board 19 for controlling the current to be supplied to the stator winding 16.

FIG. 4 is a front view of the impeller 14 shown separately from the other elements in FIG. 3, and FIG. 5 is a half section of the impeller 14 taken along the line 5—5 in FIG. 4. As shown in FIG. 4, the blades 13 are arc-like. The large number of blades 13 are attached to the body portion 15 radially to form the impeller 14. The configuration of the body portion 15 is, as shown in FIG. 5, formed in an outwardly cup shape. To the radially extended portion 15a the inner peripheral portions of the blades 13 are fixed.

The blower structured as described above is used by mounting on an air vent in a box of an office automation apparatus. The blower is attached such that the top in FIG. 3 is the outer side of the box of the office automation apparatus and the shaft 6 is horizontally oriented. In that state, when power is supplied through the control circuit on the PC board 19, controlled current passes through the stator winding 16 to generate magnetic flux through the stator core 17. Then, the magnetic interference between the magnetic flux and the magnetic flux generated by the magnet 12 rotates the rotating portion. Due to the rotation of the impeller 14, the air sucked from the center of the impeller 14 flows radially by the centrifugal force. The air is then collected in the casing 1 and is discharged from an outlet (not shown) provided in the casing 1. By this blowing, the inside of the box is cooled.

The required characteristics of a blower of this kind is represented as the relationship between the pressure P and the flowing rate Q, i.e., the P-Q characteristics. Among blowers of a given size, one with a high air flow pressure and with a large amount of air flow is determined to be one with satisfactory P-Q characteristics. When circumstances do not allow the blower to be larger and still the P-Q characteristics have to be improved, the improvement can be attained by increasing the number of rotations. However, there is a problem that merely increasing the number of rotations not only increases the noise when the blower is in operation but also shortens the lifetime of the blower.

SUMMARY OF THE INVENTION

The present invention has been made in view of the above, and an object of the invention is to provide a blower suitable for use in severe circumstances.

In order to solve the above-mentioned problems, according to a first aspect of the present invention, there is provided a blower in which a shaft is rotatably supported in a tubular casing, a cup shaped motor yoke is fixed to the shaft, and a body portion of an impeller comprising a large number of blades on an outer peripheral portion is fixed to the motor yoke, characterized in that substantially ring-like openings are provided at a portion where the blades of the body portion are mounted and on a circumference around the shaft.

According to a second aspect of the present invention, in the blower as described in the first aspect of the present invention, it is characterized in that the openings substantially form a long opening in an arc along the direction of the arrangement of the large number of blades.

In a blower structured as mentioned in the above, when the impeller is rotating, air flows through the openings provided according to the present invention.

BRIEF DESCRIPTION OF THE DRAWINGS

In the accompanying drawings:

FIG. 6 is a table showing the characteristics of the blower according to the present invention;

FIG. 7 is a table showing the characteristics of the conventional blower.

DETAILED DESCRIPTION OF THE PREFERRED EMBODIMENTS

Figure 1:
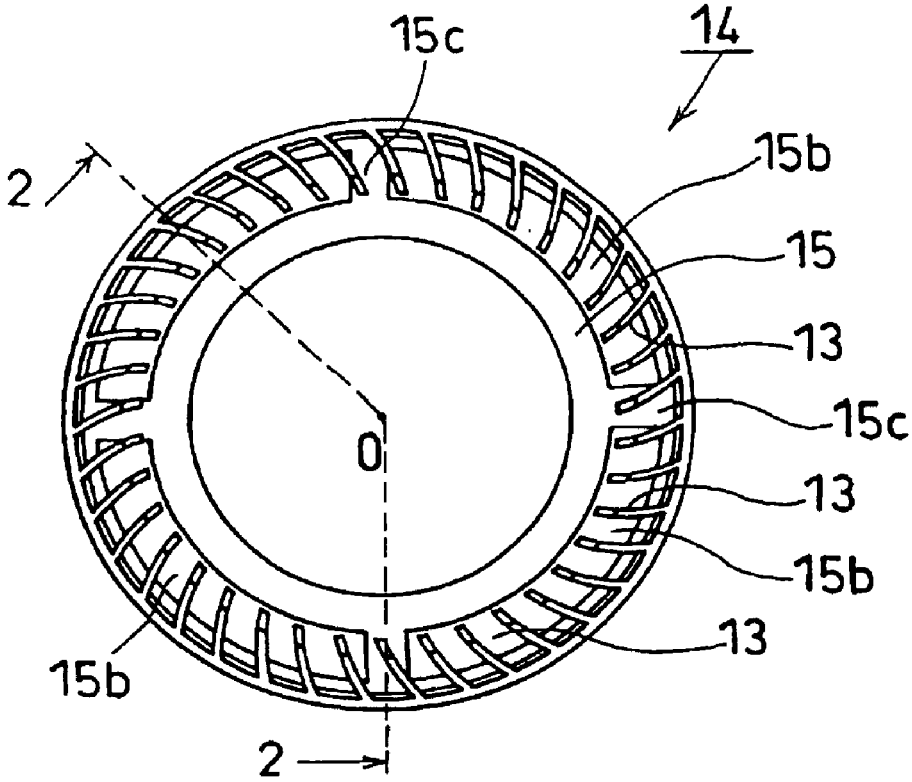
FIG. 1 is a front view of an impeller of a blower according to the present invention shown separately from other elements.
Figure 2:
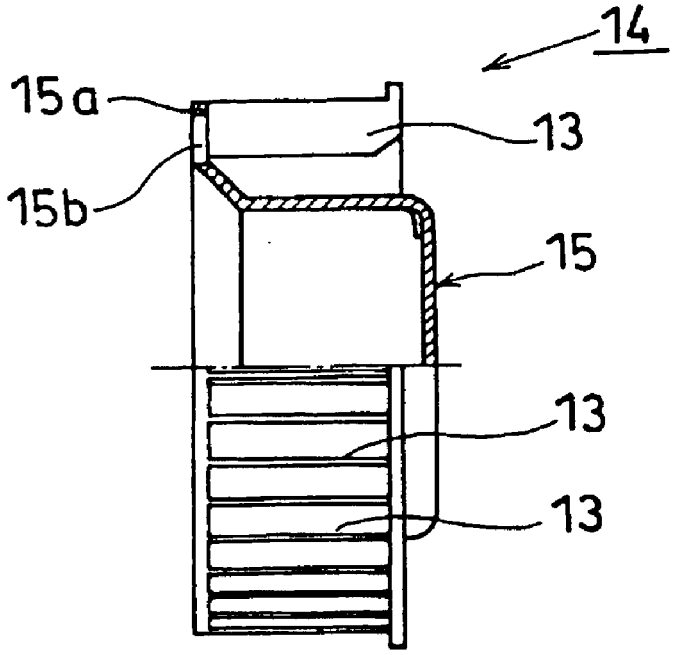
FIG. 2 is a partially sectional view of the impeller taken along line 2—2 in FIG. 1.
Figure 3:
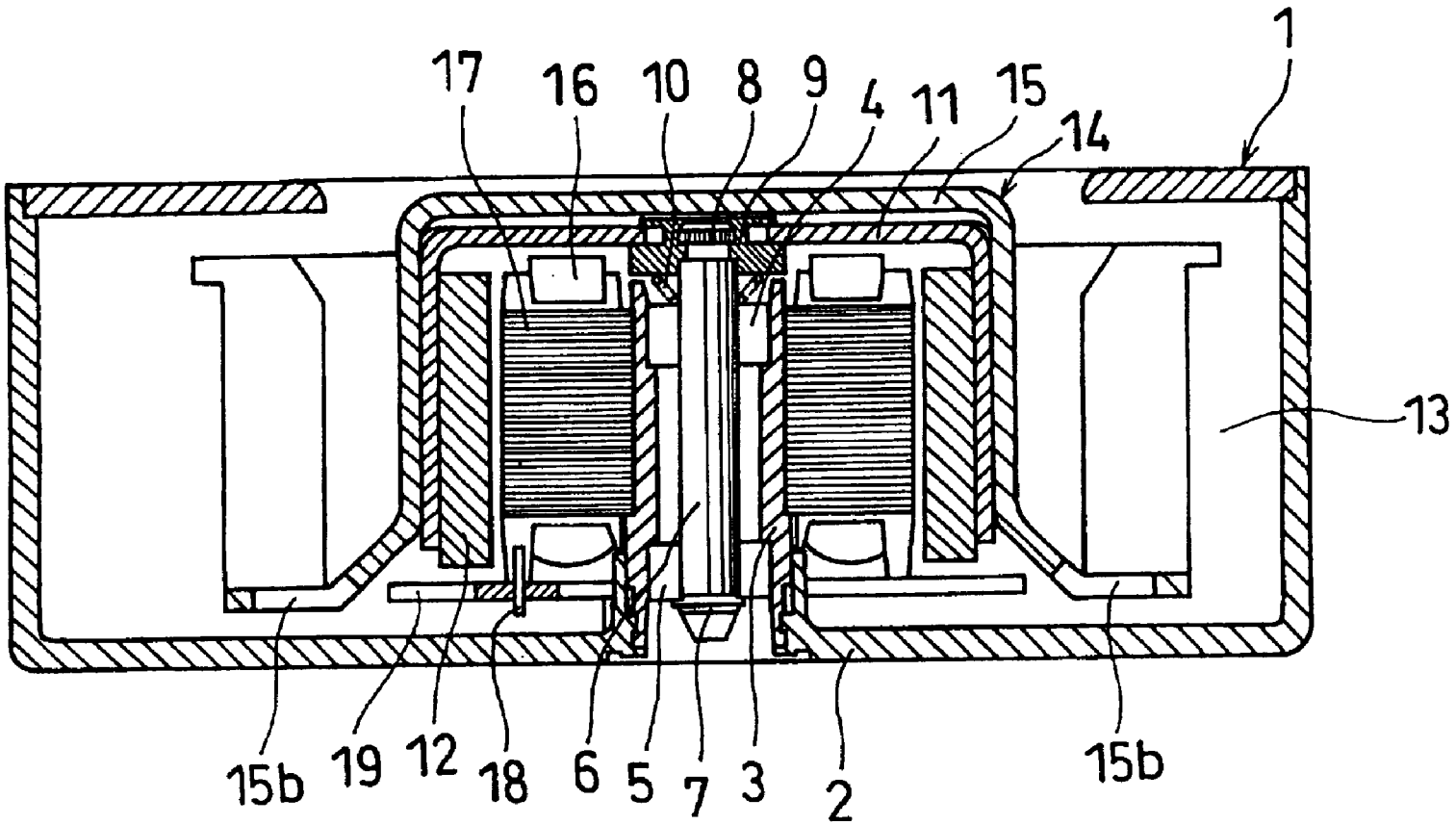
FIG. 3 is a partially sectional view of the blower according to the present invention.

An embodiment of the present invention is now described with reference to FIGS. 1 and 2. FIG. 2 is a partially sectional view of the impeller taken along the line 2—2 in FIG. 1. According to the present invention, substantially ring-like openings 15b are provided at a portion where the blades 13 of the body portion 15 are mounted (in the radially extended portion 15a) and on a circumference of a circle around the shaft 6, the openings 15b extending along the direction of the arrangement of the large number of blades 13 being extended along the axial direction of the shaft 6. As shown in FIG. 1, the openings 15b are long, and provided almost all around the circumference with only four connecting portions 15c remaining.

Figure 4:
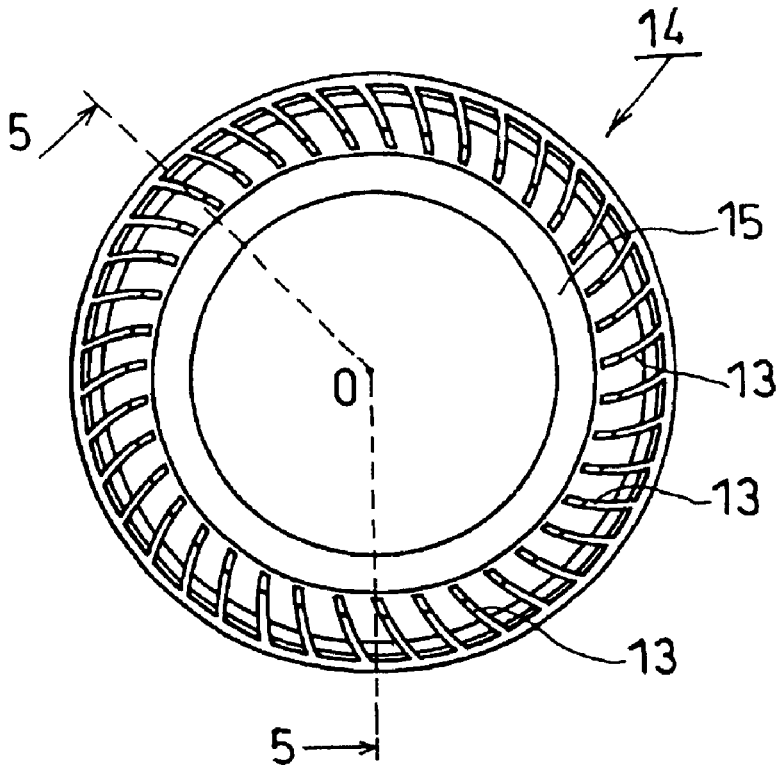
FIG.4 (Prior Art)
FIG. 4 is a front view of a conventional impeller shown separately from other elements.
Figure 5:
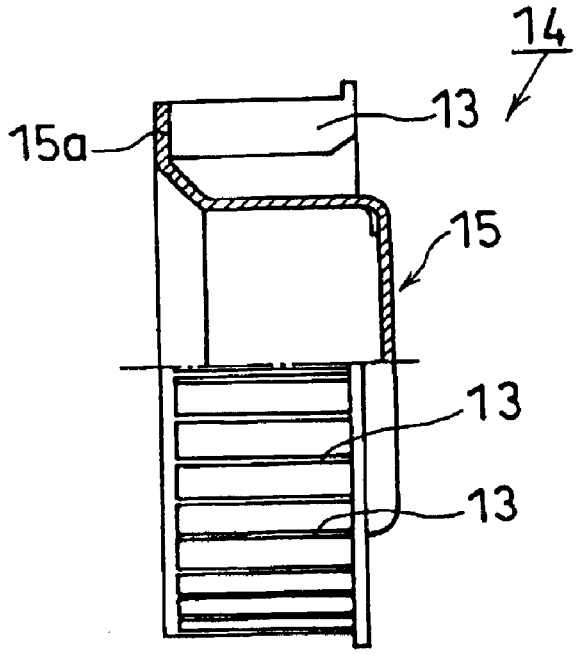
FIG.5 (Prior Art)
FIG. 5 is a partially sectional view of the impeller taken along the line 5—5 in FIG. 4.

When the blower according to the present invention with the openings 15b provided at the portion where the blades 13 of the body portion 15 are mounted (in the radially extended portion 15a) is in operation, since the blades 13 suck air from the openings 15b provided adjacent thereto, better air flowing can be obtained compared with a case where a conventional blower with no such openings (see FIGS. 4 and 5).

Figure 8:
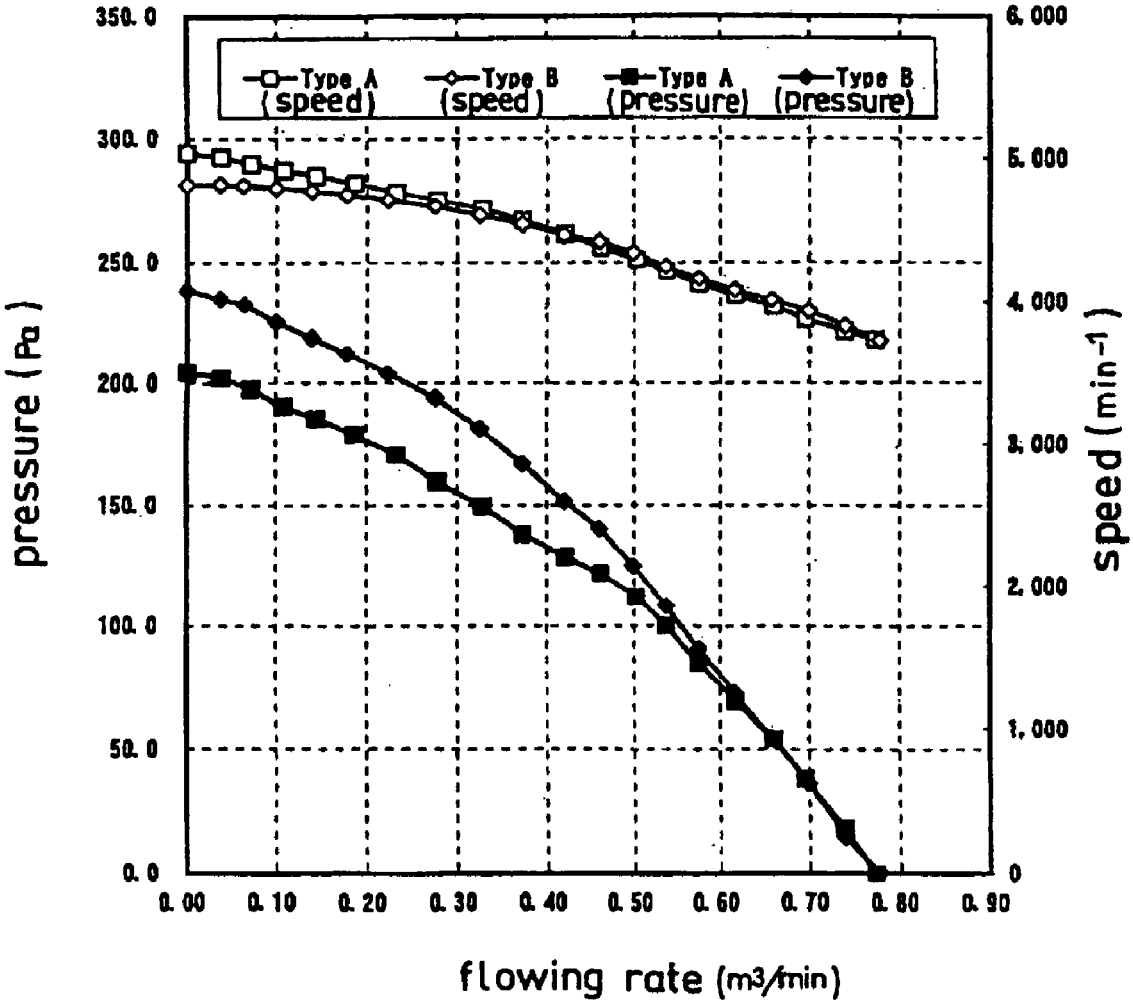
FIG. 8 is a graph showing the characteristics of the blower according to the present invention and of the conventional blower.

Tables shown in FIGS. 6 and 7 are with respect to the blower according to the present invention and the conventional blower, respectively. The tables show changes in the pressure and the speed with the flowing rate of air as the parameter. The tables show that, with the blower according to the present invention, as the flow rate decreases, the pressure rises more steeply and the speed rises more gently compared with the case where the conventional blower is used. FIG. 8 plots the data shown in FIGS. 6 and 7. In FIG. 8, type A denotes the conventional blower while type B denotes the blower according to the present invention. The data was collected from actually manufactured blowers. It can be seen that, the flow rate when, for example, the static pressure in 150 Pa is, 0.328 $m^3$/min with regard to the conventional blower and 0.419 $m^3$/min with regard to the blower according to the present invention, which clearly shows the improvement attained by the present invention.

A blower according to the first aspect of the present invention has a simple structure only with the openings provided at a portion where the blades of the body portion are attached, and thus,, the P-Q characteristics can be improved without making the blower larger. Further, a blower according to the second aspect of the present invention defining the position and the shape of the openings can enhance the above effect.

What is claimed is:

1. A blower comprising a shaft which is supported rotatably in a tubular casing, a cup shaped motor yoke fixed to said shaft, *wherein the shaft extends from a closed end of the cup shaped motor yoke to an open end of the cup shaped motor yoke,* and a body portion of an impeller comprising a plurality of blades on an outer peripheral portion fixed to said motor yoke, wherein [substantially ring-like ] openings are provided in the body portion *at a mounting portion* where said plurality of blades are mounted and on a circumference of a circle around said shaft, *and wherein the mounting portion is located substantially adjacent, in a radially outward direction, the open end of the cup shaped motor yoke.*

2. A blower according to claim 1, wherein said openings substantially form a long opening in an arc extending along the direction of the arrangement of said plurality of blades.

*3. A blower according to claim 1, wherein the openings in the mounting portion are substantially annular.*

*4. A blower comprising*

*a casing comprising a first portion having a circular space that accommodates a body portion of the blower therein and a second portion that joins to the first portion and includes an air inlet opening therein, wherein the casing further includes an outlet for air discharge;*

*the body portion comprising an impeller and having a cup shaped hub with a closed end and an open end, a plurality of blades peripherally surrounding the cup shaped hub being supported on a blades-mounting portion of the body portion; and*

*a driving motor,*

*wherein the body portion is rotated by the driving motor,*

*wherein the blades-mounting portion lies substantially adjacent, outwardly in a radial direction, the open end of the cup shaped hub, and*

*wherein the blades-mounting portion includes openings therein.*

*5. A blower according to claim 4, further including a motor yoke fixed inside the cup shaped hub of the body portion.*

*6. A blower according to claim 4, wherein the first portion of the casing includes no air inlets therein such that the air inlet in the second portion of the casing is the only air inlet for the blower.*

*7. A blower according to claim 4, wherein the openings in the blades-mounting portion are substantially annular.*

*8. A blower according to claim 4, wherein the outlet for air discharge in the casing comprises an opening in a side of the casing radial to the plurality of blades.*

*9. A blower comprising*

*a casing comprising a first portion having a circular space that accommodates a body portion of the blower therein and a second portion that joins to the first portion and includes an air inlet opening therein, wherein the casing further includes an outlet for air discharge;*

*the body portion comprising an impeller and having a cup shaped hub with a closed end and an open end, a plurality of blades peripherally surrounding the cup shaped hub being supported on a blades-mounting portion of the body portion; and*

*a driving motor,*

*wherein the body portion is rotated by the driving motor,*

*wherein the blades-mounting portion is located at a side of the casing adjacent a bottom of the circular space of the first portion, and opposite the second portion, and*

*wherein the blades-mounting portion includes openings therein.*

*10. A blower according to claim 9, further including a motor yoke fixed inside the cup shaped hub of the body portion.*

*11. A blower according to claim 9, wherein the first portion of the casing includes no air inlets therein such that the air inlet in the second portion of the casing is the only air inlet for the blower.*

*12. A blower according to claim 9, wherein the openings in the blades-mounting portion are substantially annular.*

*13. A blower according to claim 9, wherein the outlet for air discharge in the casing comprises an opening in a side of the casing radial to the plurality of blades.*

*14. A blower comprising*

*a casing comprising a first portion having a circular space that accommodates a body portion of the blower therein and a second portion that joins to the first portion and includes an air inlet opening therein, wherein the casing further includes an outlet for air discharge;*

*the body portion comprising an impeller and having a cup shaped hub with a closed end and an open end, a plurality of blades peripherally surrounding the cup shaped hub being supported on a blades-mounting portion of the body portion; and*

*a driving motor,*

*wherein the body portion is rotated by the driving motor,*

*wherein the first portion of the casing further includes a base having a protruding cylindrical portion that accommodates a bearing tube,*

*wherein the blades-mounting portion is substantially adjacent, outwardly in a radial direction, the protruding cylindrical portion, and*

*wherein the blades-mounting portion includes openings therein.*

*15. A blower according to claim 14, further including a motor yoke fixed inside the cup shaped hub of the body portion.*

*16. A blower according to claim 14, wherein the first portion of the casing includes no air inlets therein such that the air inlet in the second portion of the casing is the only air inlet for the blower.*

*17. A blower according to claim 14, wherein the openings in the blades-mounting portion are substantially annular.*

*18. A blower according to claim 14, wherein the outlet for air discharge in the casing comprises an opening in a side of the casing radial to the plurality of blades.*

*19. A blower comprising*

*a casing comprising a first portion having a circular space that accommodates a body portion of the blower therein and a second portion that joins to the first portion and includes an air inlet opening therein, wherein the casing further includes an outlet for air discharge;*

*the body portion comprising an impeller and having a cup shaped hub with a closed end and an open end, a plurality of blades peripherally surrounding the cup shaped hub being supported on a blades-mounting portion of the body portion; and*

*a driving motor,*

*wherein the body portion is rotated by the driving motor,*

*wherein the blades-mounting portion includes openings therein, and*

*wherein the first portion of the casing includes no air inlets therein such that the air inlet in the second portion of the casing is the only air inlet for the blower.*

*20. A blower according to claim 19, wherein the outlet for air discharge in the casing comprises an opening in a side of the casing radial to the plurality of blades.*

*21. A blower comprising*

*a casing comprising a first portion having a circular space that accommodates a body portion of the blower therein and a second portion that joins to the first portion and includes an air inlet opening therein, wherein the casing further includes an outlet for air discharge;*

*the body portion comprising an impeller and having a cup shaped hub with a closed end and an open end, a plurality of blades peripherally surrounding the cup shaped hub being supported on a blades-mounting portion of the body portion, wherein the blades-mounting portion includes openings therein; and*

*a driving motor,*

*wherein the body portion is rotated by the driving motor, and*

*wherein the air inlet opening in the second portion of the casing and the closed end of the cup shaped hub together form a continuous annular air inlet passageway.*

*22. A blower according to claim 21, wherein the outlet for air discharge in the casing comprises an opening in a side of the casing radial to the plurality of blades.*

* * * * *